United States Patent
Hegner et al.

(10) Patent No.: US 7,150,197 B2
(45) Date of Patent: Dec. 19, 2006

(54) CAPACITIVE PRESSURE SENSOR

(75) Inventors: Frank Hegner, Lörrach (DE); Ulfert Drewes, Müllheim (DE); Igor Getman, Lörrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/518,546

(22) PCT Filed: Jul. 1, 2003

(86) PCT No.: PCT/EP03/06961

§ 371 (c)(1),
(2), (4) Date: Sep. 21, 2005

(87) PCT Pub. No.: WO2004/005875

PCT Pub. Date: Jan. 15, 2004

(65) Prior Publication Data
US 2006/0096381 A1    May 11, 2006

(30) Foreign Application Priority Data
Jul. 2, 2002    (DE) ............................... 102 29 703

(51) Int. Cl.
*G01L 9/12*    (2006.01)
(52) U.S. Cl. ..................... 73/724; 361/283.1
(58) Field of Classification Search .......... 73/700–756; 361/283.1–283.4
See application file for complete search history.

(56) References Cited
U.S. PATENT DOCUMENTS

| | | | | |
|---|---|---|---|---|
| 4,370,890 A | * | 2/1983 | Frick | ............ 73/718 |
| 5,163,326 A | * | 11/1992 | Frick | ............ 73/708 |
| 5,167,158 A | * | 12/1992 | Kamachi et al. | ............ 73/727 |
| 5,712,428 A | | 1/1998 | Schleiferboeck | |
| 6,055,864 A | | 5/2000 | Stiller et al. | |

FOREIGN PATENT DOCUMENTS

| | | |
|---|---|---|
| DE | 44 16 978 A1 | 11/1995 |
| JP | 05223674 A * | 8/1993 |

* cited by examiner

*Primary Examiner*—Edward Lefkowitz
*Assistant Examiner*—Jermaine Jenkins
(74) *Attorney, Agent, or Firm*—Bacon & Thomas

(57) ABSTRACT

For minimizing the span error of a pressure sensor having an essentially cylindrical platform and a measuring membrane joined to an end face of the platform, wherein the pressure measuring cell is axially clamped between an elastic sealing ring, which bears against the membrane-containing, end face of the pressure measuring cell, and a support ring, which supports the measuring cell on the rear side thereof, the dimensions of the support ring are matched to the dimensions of the sealing ring and the pressure measuring cell in such a way that a radial deformation of the membrane-containing end face resulting from the axial clamping of the pressure measuring cell is sufficiently small that the span error of the pressure sensor because of a reduction of the axial clamping force by a least 10% amounts to not more than 0.02%. The geometry of the support ring is determined iteratively by means of the FEM.

12 Claims, 3 Drawing Sheets

CAPACITIVE PRESSURE SENSOR

FIELD OF THE INVENTION

The invention relates to a capacitive pressure sensor, especially a capacitive, ceramic pressure sensor.

BACKGROUND OF THE INVENTION

Such pressure sensors are used in many applications in the technology of pressure measurements, in order to measure the pressure of process media, which can be present in the form of liquids, gases or vapors. Essentially, such pressure sensors include a pressure measurement cell composed of a platform and an elastic membrane, or diaphragm, especially a ceramic platform and a ceramic membrane. A shallow recess is provided on the platform. This recess is referred to as the membrane bed. It is spanned by the membrane. During measurement, the membrane is loaded with the pressure of the process medium, and the deformation of the elastic membrane, which is registered, for example capacitively, or resistively, is a measure of the pressure. A corresponding pressure measurement cell is disclosed, for instance, in German Offenlegungsschrift DE 39 01 492.

During the taking of measurements, a pressure measurement cell is typically clamped between a media-side, elastic, sealing ring, which rests on the membrane-containing, end face of the sensor, and a support ring, which axially supports the membrane-far end surface of the platform, such as is illustrated, for example, in the German Offenlegungsschrift DE 42 13 857.

In so far as the deformation of the membrane depends, at given pressure, on the effective stiffness of the membrane, it is necessary to keep the membrane stiffness as constant as possible after calibration of the pressure sensor over the measuring range. It is, therefore, especially important that as few radial forces as possible act on the pressure measuring cell, since radially inwardly acting forces can decrease the membrane stiffness, and radially outwardly acting forces can increase the membrane stiffness.

Previous efforts for decreasing the influence of radial forces concerned, above all, de-coupling the rear-side friction. For this purpose, for example in the case of capacitive pressure sensors, which are manufactured and sold by the assignee under the name Cerabar, a polymer film is arranged between the rear, end face of the platform and the support ring. Additionally, the axial bearing pressure of the media-side, elastic sealing ring is reduced as much as possible, in order to minimize the introduction of lateral forces due to frictional locking. These measures have, it is true, already led to an improvement of measurement accuracy; however, a further reduction of disturbing radial forces seems desirable.

SUMMARY OF THE INVENTION

An object of the invention, therefore, is to provide an improved pressure sensor of the above-described type. The object is achieved according to the invention by the pressure sensor as comprising: a pressure cell having an essentially cylindrical platform of a first diameter and a first thickness, and a measuring membrane of a second diameter and a second thickness, joined to an end face of the platform; an elastic sealing ring of a third diameter and a third thickness, bearing against the membrane-containing end face of the pressure measuring cell; and a support ring of a fourth, outer diameter, a fourth inner diameter and a fourth thickness, wherein: the support ring supports the membrane-far, rear face with the pressure measuring cell, the measuring cell is axially clamped between the elastic sealing ring and the support ring, and the dimensions of the support ring are matched to the dimensions of the sealing ring and the pressure measuring cell in such a way that a radial deformation of the membrane-containing face caused by the axial clamping of the pressure measuring cell is so small, that the span error of the pressure sensor due to a reduction of the axial clamping force by at least 10% amounts to not more than 0.02%, and by the method for designing a pressure sensor comprising the steps of: (i) determining a geometry for the support ring; (ii) calculating a first span change of the pressure sensor under a first axial clamping force; (iii) calculating a second span change of the pressure sensor under a second axial clamping force; (iv) ascertaining a span error by comparing the first span change with the second span change; (v) evaluating the span error; and (vi) varying the geometry of the support ring, and repeating the steps (ii) to (vi) until a suitable geometry for a sufficiently small span error is found.

In efforts to improve a pressure senor, a further source of disturbing radial forces has been identified and substantially eliminated. A basic idea of the invention will now be explained on the basis of FIG. 2. The platform of a presure measuring cell should be sufficiently stiff, such that it does not deform when loaded by pressure. However, this is naturally not an absolute, but, rather, only an idealized statement, because the modulus of elasticity of the material of the platform is inherently a finite quanity. So, on the basis of calculations using the finite element method (hereinafter FEM), it was determined, that the axial clamping of the pressure measuring cell 6 between a sealing ring 8 and a support ring 2 can lead to an elastic deflecting of the rear side of the platform of about 10 nm to 100 nm in the axial direction.

With reference to the measuring accuracy of the pressure sensor, the inner diameter $\phi_2$ of the support ring 2 proves to be an especially critical factor in this connection. If the bearing surface of the support ring 2 is too large, i.e. if the inner diameter $\phi_2$ is too small, then the axial clamping forces, which are introduced into the pressure measuring cell, respectively the platform, by the sealing ring 8 of diameter $\phi_8$ cause bending moments in the pressure cell, which result, in total, in a radially outwardly directed deformation of the measuring membrane, such as is shown with exaggeration in FIG. 2b. In similar manner, the end surface facing the sealing ring 8 is elastically deformed radially inwardly, when the bearing surface of the support ring 2 is too small, i.e. the inner diameter $\phi_2$ of the support ring 2 is too large (compare FIG. 2c). The displacement vectors shown in the figures serve only for purposes of illustration; they are not the result of quantitative calculations.

The described radial deformations could probably be accepted, if they could be kept constant. This is, however, not practical, since the radial deformations are also a function of the axial clamping forces, which depend especially on the aging, respectively tempering, of the elastic sealing ring, through which the axial clamping forces are introduced. For example, the axial clamping force can be irreversibly reduced from 500 N to about 400 N, when a pressure sensor with a newly installed sealing ring is heated to 80°.

Changes of the radial deformation are thus practically only preventable by a design, in which, even at maximum axial clamping force, no appreciable radial deformations occur.

The solution according to the invention, therefore, rests on the idea of identifying for a pressure measuring cell of given dimensions and material properties an inner diameter $\phi_2$ of the support ring 2, at which the radial deformation of the pressure measuring cell in the area of the joints of the measuring membrane is substantially eliminated, so that the variation of the membrane stiffness because of changing axial clamping forces is minimized to a reasonable residual error. It is currently not possible to give a closed, analytic expression for the dimensions of the support ring as a function of the other dimensions. However, it is possible, without more, for those skilled in the art, on the basis of the solution path provided here, to determine the necessary dimensions of the support ring by means of the FEM. Suitable simulation software is available, for example, under the mark ANSYS.

A pressure sensor of the invention includes a pressure measuring cell having an essentially cylindrical platform of a first diameter and a first thickness, a measuring membrane of a second diameter and a second thickness joined to an end face of the platform, with the pressure measuring cell being axially clamped between an elastic sealing ring of a third diameter and a third thickness, bearing against the membrane-containing end face of the pressure measuring cell, and a support ring of a fourth outer diameter, a fourth inner diameter and a fourth thickness, with the support ring bearing against the membrane-far, rear, end face of the pressure measuring cell; wherein, furthermore, the dimensions of the support ring are matched to the dimensions of the sealing ring and the pressure measuring cell such that a radial deformation of the end face containing the membrane, related to the axial clamping of the pressure measuring cell, is so small, that the span error of the pressure sensor caused by a reduction of the axial clamping force by at least 10% amounts to not more than about 0.02%.

Preferably, the dimensions of the support ring are optimized to the extent that the span error for a reduction of the clamping force by at least 20% amounts to not more than about 0.02%.

Especially preferred is when the dimensions of the support ring are optimized to the extent that the span error in the case of a reduction of the clamping force by at least 10%, respectively at least 20%, amounts to not more than about 0.01%.

The span error means, in this connection, the deviation of the difference between the measured value at maximum pressure and the measured value in the absence of pressure loading for the case of reduced axial clamping force, and the corresponding difference at full axial clamping force. The full axial clamping force designates, for example, the axial clamping force, with which pressure sensors with new sealing rings are assembled, in order to be able to hold the pressure of the specification safely, even after a tempering, respectively aging, of the sealing ring.

In a presently preferred form of embodiment, the axial clamping force lies between 350 N and 550 N. The selected clamping force is, however, dependent in particular cases on the kind of sealing and the nominal pressure, respectively the specifications, of the pressure sensor.

Preferably, the platform and the measuring membrane are made of the same material, with a ceramic material, especially corundum, being currently preferred. The measuring membrane has preferably about the same diameter as the platform. Especially in the case of ceramic pressure sensors, the measuring membrane can be secured by means of an active braze or a glass bond on the face of the platform. In a further, preferred form of embodiment, the joint includes a sintered corundum.

The support ring uses, in the currently preferred form of embodiment, likewise the same material as the platform. This is advantageous insofar as the support ring then exhibits the same coefficient of thermal expansion as the platform. The support ring should, preferably, be made of a material which is at least as stiff as the platform. The outer diameter of support ring should not be smaller than, and is preferably equal to, the diameter of the platform. In a currently preferred form of embodiment, the support ring is fixedly connected with the platform. This can be done by soldering or brazing, preferably with an active braze, or by adhesive bonding. Finally, the support ring can be manufactured as one piece with the platform. The support ring preferably has at least the thickness of the platform.

The pressure sensor of the invention includes, preferably, a metal housing, especially of steel, with an essentially cylindrical measuring cell chamber for the pressure measuring cell, wherein the housing has an internal, axial, bearing surface, which axially supports the sealing ring. In addition, a threaded ring is preferably provided, which fits into an internal thread in the cylindrical measuring cell chamber and exerts an axial clamping force onto the rear side of the support ring, away from the pressure measuring cell.

Preferably, means are provided for minimizing friction between the threaded ring and the support ring. For this purpose, a plastic coating or film, for example of Kapton or Teflon, a hard, smooth coating, such as DLC (diamond-like carbon), or a lubricant, such as molybdenum disulfide, can be used. Preferably, the coefficient of static friction between the support ring and the threaded ring is less than 0.2.

The invention will now be explained on the basis of an example of an embodiment presented in the accompanying drawing, the figures of which show as follows:

DETAILED DESCRIPTION

Figure 1:
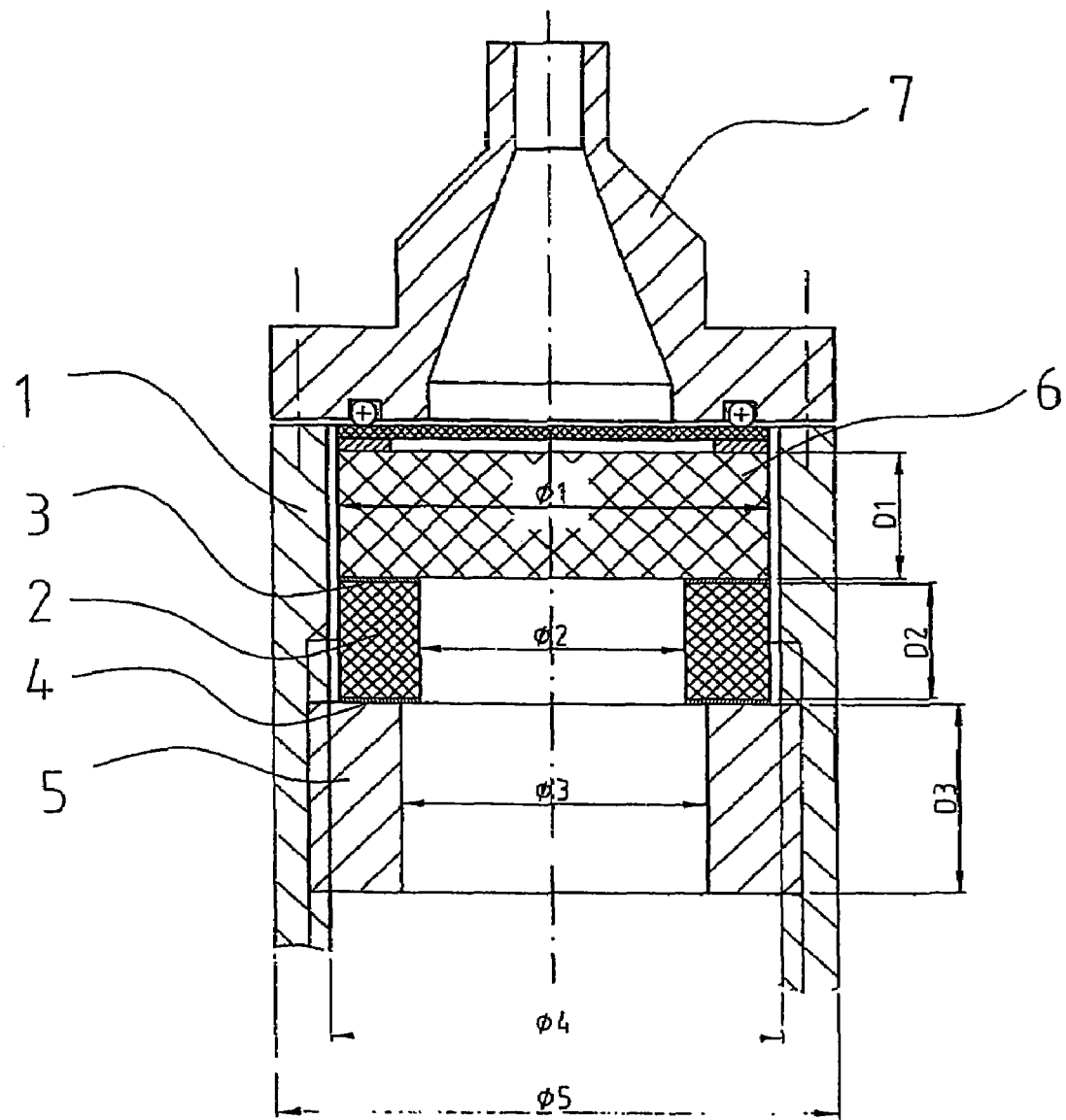
FIG. 1 is a section through a pressure sensor of the invention.
Figure 2:
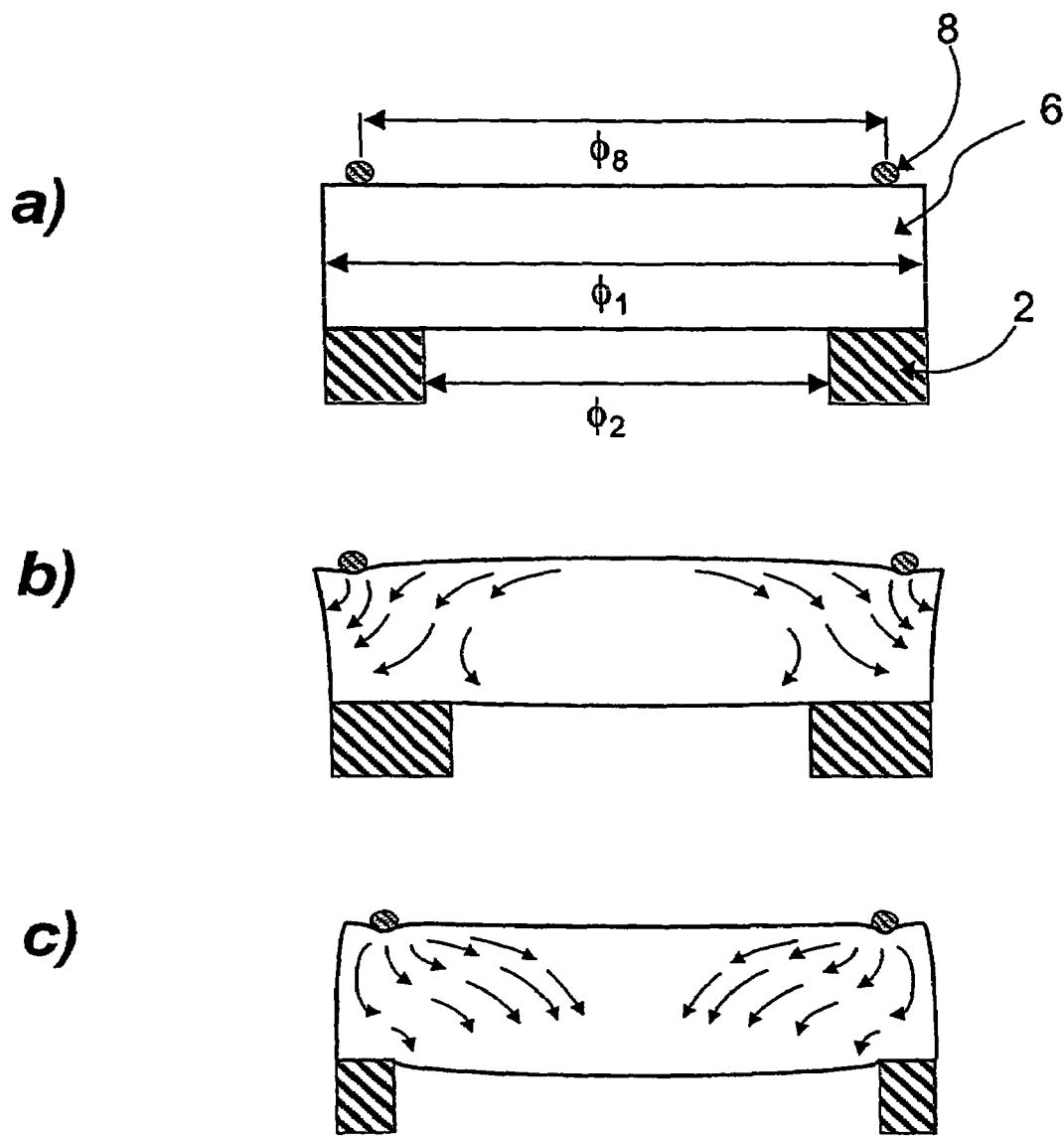
FIGS. 2(a)–2(c) are schematic representations of the radial deformation of a pressure measuring cell on the basis of axial clamping forces.

The pressure sensor shown in FIG. 1 includes a pressure measuring cell 6 having a platform and a measuring membrane of corundum secured to the front face of the platform by means of an active braze. A support ring 2 of corundum, whose outer diameter equals the diameter $\phi_1$ of the platform, is secured by means of an active braze to the rear face of the platform. The pressure measuring cell 6 and the support ring 2 are arranged in a housing of stainless steel having a cylindrical measuring cell chamber 1 and a process connection flange 7 arranged at an opening at an end of the measuring cell chamber 1. The process connection flange 7 extends radially inwardly from the cylindrical wall of the measuring cell chamber and, in doing so, forms an axial bearing surface in which an annular groove 71 is formed for receiving an elastic sealing ring 8. The pressure measuring cell 6 presses with its face carrying the membrane axially against the sealing ring 8.

The clamping force is determined by the compression of the sealing ring 8 and its elastic properties. The compression of the sealing ring is set in the assembly of the pressure sensor by the position of the threaded ring 5 acting against the rear face of the support ring 2. The elastic properties change due to aging, respectively tempering, of the sealing ring under compression. In the case of the described example of an embodiment, the initial clamping force amounts to 500 N. After a tempering of the sealing ring, which can occur in operation due to cleaning cycles of the sensor with steam, the clamping force is reduced to 400 N.

Identification of the optimum inner diameter $\phi_2$ of the support ring will now be explained for an example of an embodiment. The particular dimensions were: Platform diameter $\phi_1$=32.4 mm, thickness of the platform D1=5 mm, thickness of the membrane 160 µm, thickness of the active braze layer 55 µm. The support ring was assumed to be "infinitely stiff".

By means of the FEM, the deformation for axial clamping forces of 500N and 400N was determined for different inner diameters $\phi_2$ of the support ring, and the span resulting therefrom in the case of loading with nominal pressure was likewise calculated with the FEM. The span error is determined by comparing the spans at 500 N clamping force and at 400 N clamping force.

Figure 3:
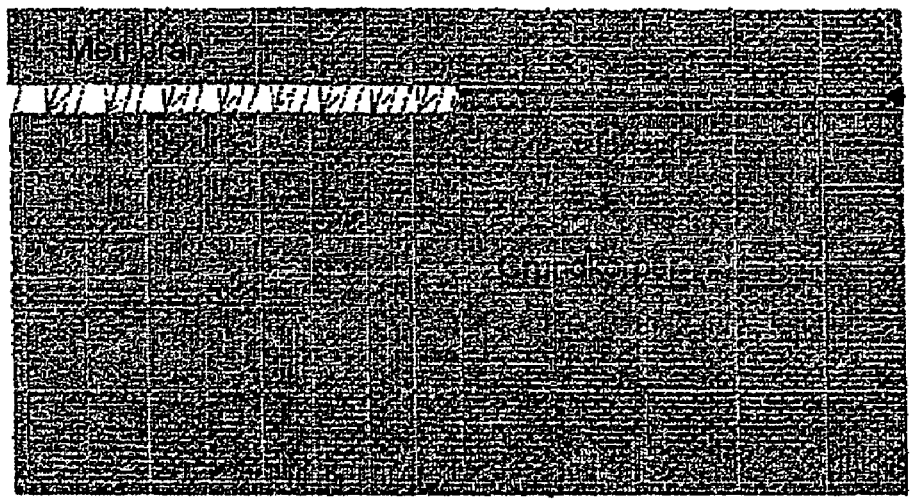
FIGS. 3(a)–3(c) show the FEM data regarding the deformation of a pressure measuring cell under axial clamping forces.
Figure 3:
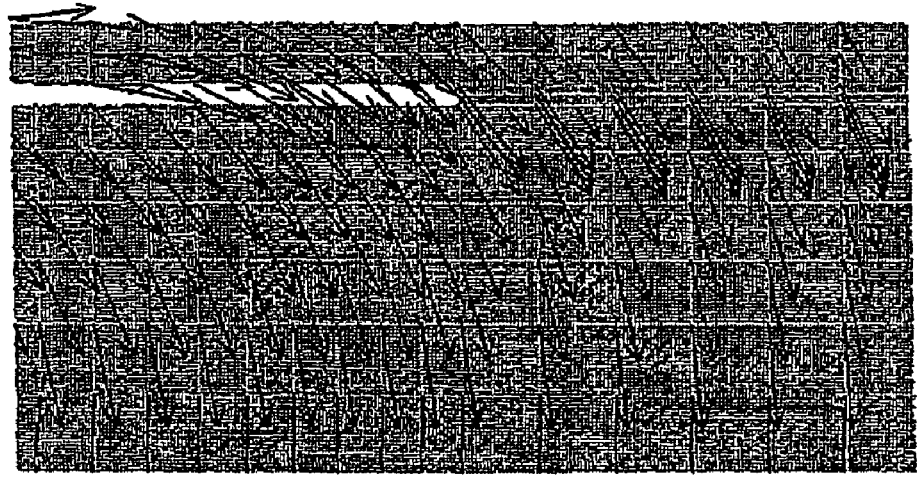
Figure 3:
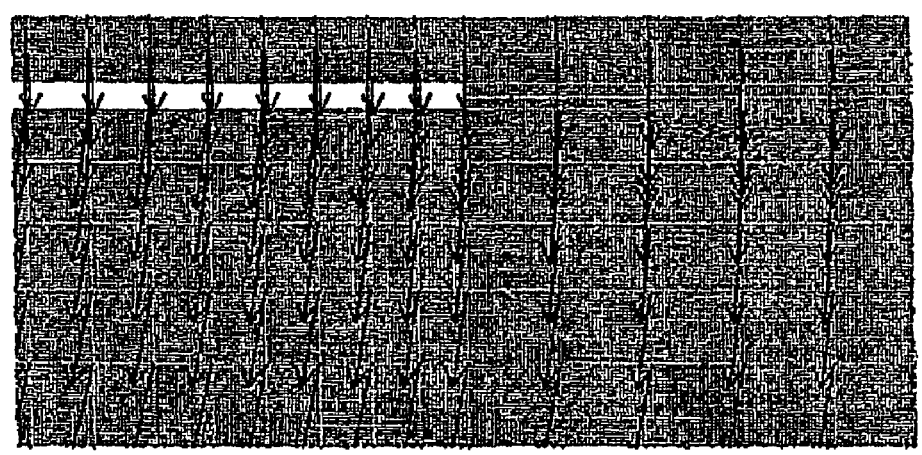

By varying the inner diameter $\phi_2$, the optimum, respectively a sufficiently good, value can be determined, as is shown on the basis of FIGS. 3*a*–*c*.

FIGS. 3*a*–*c* show a vector representation of the displacement for a section around the inner edge of the joint between the platform and the measuring membrane for different inner diameters $\phi_2$ of the support ring.

In FIG. 3*a*, the inner diameter amounts to 27.8 mm. This inner diameter is too large. The illustrated vector field at a clamping force of 500 N shows a radially inwardly directed displacement, which reduces membrane stiffness. The span thus becomes greater in this case. The span change compared to the not-clamped cell amounts to about +0.8%. In the case of a clamping force of 400N, the span change is reduced to about +0.64%. The span error thus amounts to about −0.16%.

In FIG. 3*b*, the inner diameter amounts to 10.0 mm. This inner diameter is too small. The illustrated vector field in the case of a clamping force of 500 N shows a radially outwardly directed displacement, which increases the membrane stiffness. The span thus becomes smaller in this case. The span change compared to the non-clamped cell amounts to about −0.1%. In the case of a clamping force of 400N, the span change is reduced to about −0.08%. The span error, therefore, amounts to +0.02%.

In FIG. 3*c*, the inner diameter is 23.2 mm. This value is almost ideal. The illustrated vector field in the case of a clamping force of 500 N shows scarcely any radial displacement in the area of the joint that could change the membrane stiffness. The span change compared to the not-clamped cell amounts to about −0.01%. In the case of a clamping force of about 400N, the span change is reduced to about −0.008%. The span error amounts, therefore, to +0.002%.

In this way, an inner diameter is found for a support ring appropriate for given dimensions of the pressure measuring cell for substantially eliminating radial deformation of the pressure measuring cell arising from axial clamping forces. In turning this knowledge into practice, the support ring is preferably given a thickness not less than the thickness of the pressure measuring cell, in order to do justice to the assumption of a sufficiently stiff, axial support.

In a further embodiment of the method for determining the ideal geometry of the support ring, a support ring of finite stiffness with the same modulus of elasticity as the platform of the pressure measuring cell was assumed. Both the thickness of the support ring and its inner diameter, as well as the friction between the support ring and the threaded ring were varied. The results confirmed that the previously described simulation assuming an infinitely stiff support ring had already identified a suitable inner diameter. The assumption of infinite stiffness of the support ring proves, naturally, to be more appropriate for support rings of a thickness equal to the thickness of the platform than for thinner support rings. In the case of thinner support rings, for example of thickness 0.25-times the thickness of the platform, current thinking is that the influence of the friction between the support ring and the threaded ring is greater than is the case with support rings with the thickness of the platform.

When a thinner support ring is to be used, it is, therefore, advantageous to perform the simulation with the more complex model, which takes the friction between the support ring and the threaded ring and the elastic properties of the support ring into consideration. Of course, the results for thick support rings, for example those with the thickness of the platform, are more exact with the more complex model, but suitable geometries can be identified, as already mentioned, already with the simpler model.

Finally, the dimensions of the threaded ring were also varied, and the results of such showed that the influence of these dimensions can essentially be ignored.

The invention claimed is:

1. A pressure sensor, comprising:
a pressure measuring cell having an essentially cylindrical platform of a first diameter and a first thickness, and a measuring membrane of a second diameter and a second thickness, joined to an end face of the platform;
an elastic sealing ring of a third diameter and a third thickness, bearing against the membrane-containing end face of the pressure measuring cell; and
a support ring of a fourth, outer diameter, a fourth inner diameter and a fourth thickness, wherein:
said support ring supports the membrane-far, rear face of said pressure measuring cell;
said measuring cell is axially clamped between said elastic sealing ring and said support ring; and
the dimensions of said support ring are matched to the dimensions of said sealing ring and said pressure measuring cell in such a way that a radial deformation of the membrane-containing face caused by the axial clamping of said pressure measuring cell is so small, that the span error of the pressure sensor due to a reduction of the axial clamping force by at least 10% amounts to not more than 0.02%.

2. The pressure sensor as claimed in claim 1, wherein:
the inner diameter of said support ring is chosen such that the span error in the case of a reduction of the clamping force by at least 20% amounts to not more than about 0.02%.

3. A pressure sensor as claimed in claim 1, wherein:
the inner diameter of the support ring is chosen such that the span error in the case of a reduction of the clamping force by at least 10%, respectively at least 20%, amounts to not more than about 0.01%.

4. The pressure sensor as claimed in claim 1, wherein:
axial clamping force amounts to between 350 N and 550 N.

5. The pressure sensor as claimed in claim 1, wherein:
said platform and said measuring membrane are made of the same material, especially a ceramic material.

6. The pressure sensor as claimed in claim 1, wherein:
said support ring is made of the same material as said platform.

7. The pressure sensor as claimed in claim 1, wherein:
said support ring is connected fixedly to said platform.

8. The pressure sensor as claimed in claim 1, wherein:
said support ring has at least the thickness of said platform.

9. The pressure sensor as claimed in claim 1, further comprising:
a housing with a measuring cell chamber for receiving said pressure measuring cell, wherein:
said housing has an internal, axial bearing surface, which axially supports said sealing ring, and a threaded ring, which engages an internal thread in a wall of said measuring cell chamber and exerts an axial clamping force on the rear, measuring-cell-far side of said support ring.

10. The pressure sensor as claimed in claim 9, further comprising:
means for minimizing the friction between said threaded ring and said support ring.

11. The pressure sensor as claimed in claim 9, wherein:
the coefficient of static friction between said support ring and said threaded ring is less than 0.2.

12. A method for the iterative optimizing of the dimensions of a support ring for a pressure sensor, comprising the steps of:

(i) determining a geometry for the support ring; (ii) calculating a first span change of the pressure sensor under a first axial clamping force; (iii) calculating a second span change of the pressure sensor under a second axial clamping force; (iv) ascertaining a span error by comparing the first span change with the second span change; (v) evaluating the span error; and (vi) varying the geometry of the support ring, and repeating the steps (ii) to (vi) until a suitable geometry for a sufficiently small span error is found.

* * * * *